United States Patent Office

2,821,550
Patented Jan. 28, 1958

2,821,550

PROCESS OF PREPARING 4-NITRO-2-STILBENE SULFONIC ACID SALTS

Albert F. Strobel, Albany, N. Y., assignor to General Aniline & Film Corporation, New York, N. Y., a corporation of Delaware No Drawing. Application December 27, 1956
Serial No. 630,729

6 Claims. (Cl. 260—505)

This invention relates to p-nitro-substituted-o-sulfonated stilbenes and particularly to an improved process of preparing p-nitrostyryl-2-sulfonic acid salts.

p-Nitro-2-stilbene-sulfonic acid and salts thereof are well known. Such compounds are employed as dye intermediates and are generally prepared by several methods. The general, or well known, method involves the condensation of 2,4-dinitrotoluene with an aromatic aldehyde in the presence of a strong secondary organic base such as piperidine.

Another method consists of replacing one of the nitro groups in the 2,4-dinitrotoluene by a cyano group and then condensing the resulting nitrotolylnitrile with an aromatic aldehyde to yield the corresponding styrylbenzene derivative. It has been recognized by the chemical art that this method fails when an attempt is made to replace one of the nitro groups in the 2,4-dinitrotoluene by a sulfonic acid group so as to yield a nitrostilbene-sulfonic acid. It has also been recognized by the art that when an attempt is made to weaken the acid nature of the sulfonic acid group by replacing one of the nitro groups in the 2,4-dinitrotoluene by the sulfonamide group, or to remove it altogether by the employment of a sulfonic acid dimethylamide or a sulfonic acid alkyl ester group, the condensation with an aromatic aldehyde does not proceed in the desired direction and at most gives a yield which is technically uninteresting and commercially unfeasible.

In order to overcome the foregoing shortcomings, it has been proposed by the art to condense an aromatic aldehyde with either a 4-nitrotoluene-2-sulfonic acid phenyl ester or a 2-nitrotoluene-4-sulfonic acid phenyl ester in the presence of a basic catalyst such as a secondary organic base, i. e. piperidine, morpholine and the like, at an elevated temperature ranging from 120–170° C. in the presence of a high boiling organic solvent followed by saponification of the sulfonic acid phenyl ester group to the sulfonic acid group.

To prepare 4-nitro-2-stilbene sulfonic acid salts while employing lower temperature and eliminating the use of sulfonic acid phenyl esters of 2- or 4-nitrotoluene and eliminating the step involving saponification of the sulfonic acid phenyl ester group to the sulfonic acid group constitutes the principal object of the present invention.

I have found that 4-nitro-2-stilbene sulfonic acid salts are readily prepared by condensing an aromatic aldehyde with a p-nitrotoluene-2-sulfonic acid salt at a temperature ranging between 95°–110° C. in the presence of a secondary or tertiary organic amine as a solvent and in the presence of a strong secondary aliphatic, alicyclic, or heterocyclic amine as a catalyst. The presence of both the solvent and catalyst is an essential prerequisite for the improved condensation reaction. The essential factor stemming from this prerequisite is that the alkalinity range which varies between about pH 9–12 (phenolphthalein pink and Clayton Yellow orange) provides a system in which the aromatic aldehyde and the p-nitrotoluene-2-sulfonic acid salt have considerable solubility at the condensation temperature, i. e. 95°–110° C. which is the most favorable temperature range to form the desired stilbene in exceptionally good yields. Under these conditions aromatic aldehydes condense smoothly with p-nitrotoluene-2-sulfonic acid salts at about 100° C. with either a secondary or tertiary organic base as a solvent and a strongly basic secondary organic base as a catalyst. The reaction product, on isolation by drowning in water and salting out, yields an essentially pure-p-nitrostyryl-2-sulfonic acid salt.

The solvents employed in the condensation reaction may be either secondary or tertiary aliphatic, alicyclic and heterocyclic amines. As examples of such solvents, the following are illustrative:

AMINE SOLVENTS

Secondary:
 Dimethylamine
 Diethylamine
 Dipropylamine
 Dibutylamine
 Diethanolamine
 Dipropanolamine
 Dibutanolamine
 Dicyclohexylamine
 Pyrrolidine
 Morpholine
 Piperidine
 2-methylpiperidine
 N,N'-dimethyl ethylene diamine
 N,N',N''-trimethyl diethylene triamine Tertiary:
 Trimethylamine
 Triethylamine
 Tripropylamine
 Tributylamine
 Dimethylethylamine
 Diethylmethylamine
 Diethylpropylamine
 Triethanolamine
 Tripropanolamine
 Tributanolamine
 N-methylpiperidine
 N-methyl pyrrolidine
 N,N-dimethylcyclohexylamine As illustrative examples of catalysts, the following secondary aliphatic, alicyclic, and heterocyclic amines are given:

CATALYSTS (*Secondary amines*)

Anyone of the foregoing secondary amines which are employed as solvents.

Dicyclohexylamine
Morpholine
Pyrrolidine
Piperidine
2-methylpiperidine

The nature or character of the aromatic benzaldehyde, employed in the foregoing condensation reaction, is immaterial. Any aromatic aldehyde whether containing none or one or more substituents in the aryl nucleus is operative for the purpose of the present invention and includes benzaldehyde, naphthaldehyde, terephthaldehyde, p-tolualdehyde, p-cuminaldehyde and various substituted derivatives thereof as will become apparent from the working examples.

In connection with the secondary and tertiary amines employed as solvents, it is to be noted that those that have low boiling points, i. e. at 100° C. and below, it is essential to utilize pressure equipment for the condensation reaction. To illustrate this point, if diethylamine is used as a solvent and/or catalyst, it is necessary to use a pressure vessel for the reaction since at 100° C. diethylamine quickly boils off. The amount of solvent employed is not critical and may vary considerably depending upon the reactants and the particular solvent selected. I have found that for practical purposes, consistent with good yields, about one-half to twice the weight of solvent is employed as the weight of the 4-nitrotoluene-2-sulfonic acid salt. Instead of employing secondary and tertiary amines, small or moderate amounts of other solvents such as, for example, lower aliphatic alcohols and alkylol ethers, such as methyl alcohol, ethyl alcohol, isopropyl alcohol, ethylene glycol, ethylene glycol methyl ether (Cellosolve), ethylene glycol ethyl ether (ethyl Cellosolve), diethylene glycol, diethylene-glycol monomethyl ether, dioxane, etc. may be added. I prefer however, to employ basic solvents and particularly triethanolamine because of the large mutual solubility of the aromatic aldehydes and 4-nitrotoluene-2-sulfonic acid salts in this medium at the aforementioned reaction temperatures. The catalytic amount of any of the strong secondary aliphatic, alicyclic and heterocyclic amines should be present in an amount of about 2–10% by weight based on the weight of the 4-nitrotoluene-2-sulfonic acid salt. In the event the solvent selected is a very strong secondary heterocyclic amine, i. e. piperidine, the solvent and catalyst in such case may be the same.

In addition to the elimination of the prior art steps involving preparation of the sulfonic phenyl ester and subsequent hydrolysis thereof after condensation to the stilbene derivative, the improved method in accordance with the present invention, which is direct, permits the preparation of polysulfonated stibenes not readily obtainable from the condensation reaction while employing the 4-nitrotoluene-2-sulfonic phenyl ester.

The 4-nitrotoluene-2-sulfonic acid salts utilized in the condensation reaction with an aromatic aldehyde are characterized by the following general formula:

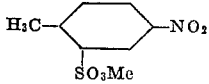

wherein Me represents a basic inorganic or organic ion group, i. e. alkali metal ion, such as lithium, sodium, potassium, and alkali earth ion such as 1/2 calcium, etc., tetraalkyl ammonium ion, e. g. tetramethylammonium, tetraethylammonium, tetrapropylammonium, trimethylbenzylammonium, and the like.

Prior to condensation with the aromatic aldehyde, the 4-nitrotoluene-2-sulfonic acid, and various derivatives thereof, are converted to the salt by conventional means.

The only precaution to be observed in the selection of suitable 4-nitrotoluene-2-sulfonic acid salts is that there be no free hydrogen atom on the ammonium radical. In other words, if the ammonium salts or dimethyl ammonium salts of 4-nitrotoluene-2-sulfonic acid is used in the above reaction system no condensation reaction to the stilbene whatsoever takes place. This is unique and surprising and no plausible explanation can be offered at the present time.

The following examples will illustrate how the improved process of the present invention may be practiced. It is to be clearly understood that they are given for purposes of illustration and are not to be construed as being limitative of the invention claimed.

EXAMPLE I

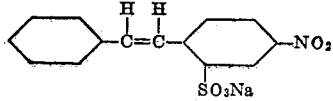

406.5 grams of 4-nitrotoluene-2-sulfonic acid (1.88 moles) was converted to the sodium salt by kneading it in a Werner-Fleiderer mixer, adding 50 mls. of water, then gradually adding 100 grams of sodium carbonate. The material was then evaporated to dryness and crushed. The dry powder was mixed with 631 grams of triethanolamine, 398 grams of benzaldehyde (3.76 moles) and 18.8 grams of piperidine. The mixture was heated to 100° C. and held at this temperature for 72 hours under nitrogen. To it was then added 4700 mls. of water and 850 grams of benzene. The 2-phase system was stirred, after which the benzene layer was drawn off removing unreacted benzaldehyde. The aqueous layer was treated with 750 grams of sodium chloride and stirred until room temperature was reached. The precipitate of sodium 4-nitro-2-stilbenesulfonate was filtered, washed with 1800 mls. of 10% aqueous sodium chloride solution, (wt./vol.), followed by 350 mls. of benzene. The presscake was dried giving the sodium 4-nitro-2-stilbenesulfonate containing 15% salt. The yield amounted to 60%, compared with 50% overall yield by the sulfonyl ester method.

EXAMPLE II

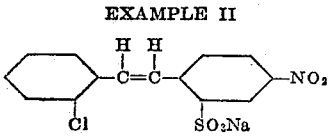

This compound is prepared in the same manner as the stilbene of Example I, using equimolar amounts of o-chloro-benzaldehyde in place of the benzaldehyde.

EXAMPLE III

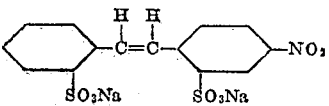

The condensation product in triethanolamine was prepared by heating at 100° C. for 72 hours a mixture of 56.0 grams of 4-nitrotoluene-2-sulfonic acid sodium salt, 61.2 grams of benzaldehyde-2-sulfonic acid sodium salt, 2.0 mols of piperidine, and 120 mls. of triethanolamine with a flow of nitrogen over the surface. The thick slurry was then poured into 750 mls. of water and 90 grams of sodium chloride added. A yellow precipitate gradually formed over a period of 4 hours. When no further precipitation occurred, the material was filtered and washed with 1 liter of 15% aqueous sodium chloride solution. The material was then dried and analyzed, giving 55% of the sodium salt of p-nitrostyryl-2,2'-disulfonic acid. The product was reduced to the amine for use in the synthesis of brightening agents.

EXAMPLE IV

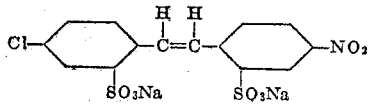

The condensation is carried out as in Example I using an equimolecular proportion of p-chloro-benzaldehyde in place of the benzaldehyde, using an equal number of grams of diethylamine in place of the piperidine. Because of the volatility of the diethylamine it is necessary to run the reaction in an autoclave to prevent escape of diethylamine.

EXAMPLE V

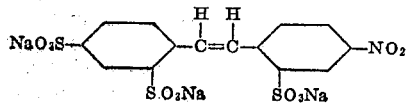

The condenstaion reaction is carried out exactly as in Example I with the exception that the benzaaldehyde is replaced by an equimolecular proportion of the sodium salt of benzaldehyde-2,4-disulfonic acid. After drawing off the benzene layer, the aqueous layer was treated with an equal volume of isopropanol whereupon a precipitate of the sodium salt of trisulfonitrostilbene is obtained. The final product was obtained by filtration and drying.

EXAMPLE VI

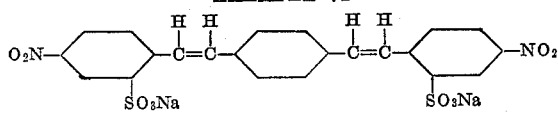

Example I was again repeated with the exception that the benzaldehyde was replaced by ½ molecular proportion of terephthalaldehyde

EXAMPLE VII

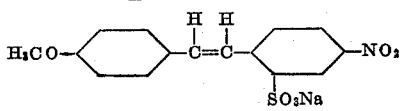

Example I was again repeated with the exception that the benzaldehyde was replaced by an equimolecular proportion of p-methoxybenzaldehyde.

EXAMPLE VIII

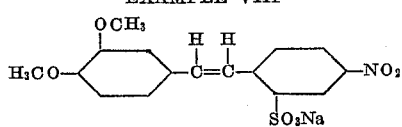

Example I was again repeated with the exception that the benzaldehyde was replaced by an equimolecular proportion of veratraldehyde (3,4-dimethoxybenzaldehyde).

EXAMPLE IX

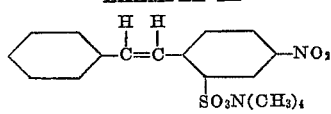

Example I was again repeated with the exception that the sodium salt of 4-nitrotoluene-2-sulfonic acid was replaced by an equimolecular proportion of the tetramethylammonium salt of the 4-nitrotoluene-2-sulfonic acid, prepared by mixing in water equimolar amounts of 4-nitrotoluene-2-sulfonic acid and tetramethylammonium hydroxide followed by evaporation and drying of the resulting salt, and the triethanolamine was replaced by an equimolecular proportion of diethanolamine.

EXAMPLE X

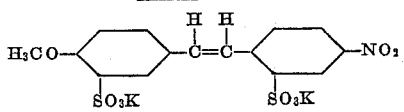

Example I was again repeated with the exception that the benzaldehyde was replaced by an equimolar proportion of p-methoxybenzaldehyde-3-sulfonic acid and the sodium carbonate by an equimolar proportion of potassium carbonate. In addition, the triethanolamine as a solvent was replaced by an equimolar proportion of piperidine so that the total number of grams of piperidine as a combined solvent and catalyst amounted to 649.8 grams. The reaction mixture was heated for 50 hours at a temperature of 110° C. The final product was isolated by pouring it into a salt solution consisting of 750 mls. of water containing 90 grams of dissolved sodium chloride. The precipitate gradually formed over a period of about 4 hours. When no further precipitate occurred, the material was filtered and washed with approximately 1 liter of 15% aqueous sodium chloride solution, followed by drying.

EXAMPLE XI

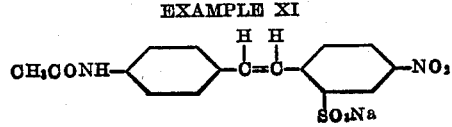

Example I was again repeated with the exception that the benzaldehyde was replaced by an equimolar proportion of p-acetamidobenzaldehyde.

EXAMPLE XII

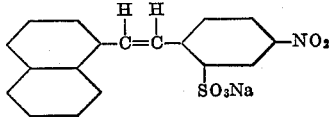

Example I was again repeated with the exception that the benzaldehyde was replaced by an equimolar proportion of naphthaldehyde.

EXAMPLE XIII

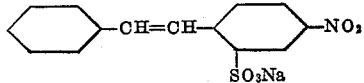

Example I was repeated with the exception that the triethanolamine was replaced by an equal weight of ethylene glycol monomethyl ether.

All of the foregoing 4-nitrostilbene-2-sulfonic acid salts, because of their high purity, have been utilized successfully as intermediates in the preparation of dyestuffs and stilbene brightening agents.

EXAMPLE XIV

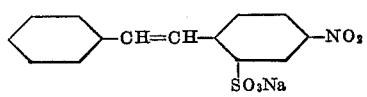

Example I was again repeated with the exception that the triethanolamine was replaced by an equal weight of dioxane. The resulting salt is of high purity and can be effectively employed as an intermediate in the preparation of dyestuffs and stilbene brightening agents.

I claim:
1. The process of preparing p-nitrostilbene-2-sulfonic acid salt which comprises condensing an aromatic aldehyde with a p-nitrotoluene-2-sulfonic acid salt, having the following formula:

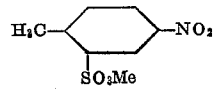

wherein Me represents a positive ion selected from the group consisting of alkali metal, alkali earth metal, and tetraalkylammonium ions, at a temperature of 95°–100° C. in the presence of an organic solvent selected from the class consisting of lower aliphatic alcohols, alkylol ethers, dioxane, secondary and tertiary amines and in the presence of a catalyst consisting of a secondary amine, said solvent being present in an amount ranging from one-half to twice the weight of the said salt and the said catalyst being present in an amount ranging from 2–10% by weight of said salt, the basicity of the reaction mixture being such that a small portion dissolved in water will have a pH of 9–12.

2. The process according to claim 1 wherein the aromatic aldehyde is benzaldehyde.
3. The process according to claim 1 wherein the aromatic aldehyde is terephthaldehyde.
4. The process according to claim 1 wherein the aromatic aldehyde is naphthaldehyde.
5. The process according to claim 1 wherein the aromatic aldehyde is o-chlorobenzaldehyde.
6. The process according to claim 1 wherein the aromatic aldehyde is benzaldehyde-2-sulfonic acid sodium salt.

No references cited.